United States Patent [19]

Fisher

[11] Patent Number: 5,115,109
[45] Date of Patent: May 19, 1992

[54] SPEED DETECTOR FOR TRAFFIC CONTROL

[76] Inventor: James R. Fisher, 202 Roolooware Road, Cronulla, New South Wales, 2230, Australia

[21] Appl. No.: 490,690
[22] PCT Filed: Aug. 17, 1988
[86] PCT No.: PCT/AU89/00348
§ 371 Date: Mar. 20, 1990
§ 102(e) Date: Mar. 20, 1990
[87] PCT Pub. No.: WO90/02410
PCT Pub. Date: Mar. 8, 1990

[30] Foreign Application Priority Data

Aug. 17, 1988 [AU] Australia ............... PI9934

[51] Int. Cl.⁵ .................................. H01H 21/26
[52] U.S. Cl. ........................... 200/86 A; 73/146; 200/333; 340/666
[58] Field of Search ........... 200/5 R, 5 A, 333, 512, 200/86 R, 86 A; 340/665, 666, 441, 933, 936; 307/119, 147, 148; 73/146

[56] References Cited

U.S. PATENT DOCUMENTS 2,783,327  2/1957  Luckey ................ 200/86 R
3,821,500  6/1974  Newman ............... 200/86 R
3,983,531  9/1976  Corrigan .............. 340/936
4,192,394  3/1980  Simpson .............. 200/86 A
4,401,896  8/1983  Fowler ................ 200/86 R
4,455,465  6/1989  Habeger ............... 200/86 R
4,963,705  10/1990 Broderick .............. 73/146

FOREIGN PATENT DOCUMENTS 262729   9/1963  Australia .
0267032  11/1987 European Pat. Off. .
2926312  1/1981  Fed. Rep. of Germany .
1500268  11/1967 France .
859049   1/1961  United Kingdom .
937902   9/1963  United Kingdom .
2109635  6/1983  United Kingdom .
2125598  3/1984  United Kingdom .

Primary Examiner—Gerald P. Tolin

[57] ABSTRACT

A system used for monitoring the flow and speed of traffic has a strip member (1) comprising electrical contacts (3, 7) on distinct layers (2, 6) separated by a dielectric spacer layer (4), such that, when a vehicle drives over the strip, the weight of the vehicle on the strip closes the contact through holes (5) in the dielectric spacer to cause a monitoring and/or timing means to be activated and subsequently deactivated. The monitoring and/or timing means is programmable to distinguish vehicle types and between a plurality of vehicles passing over the strip at the same time.

4 Claims, 3 Drawing Sheets

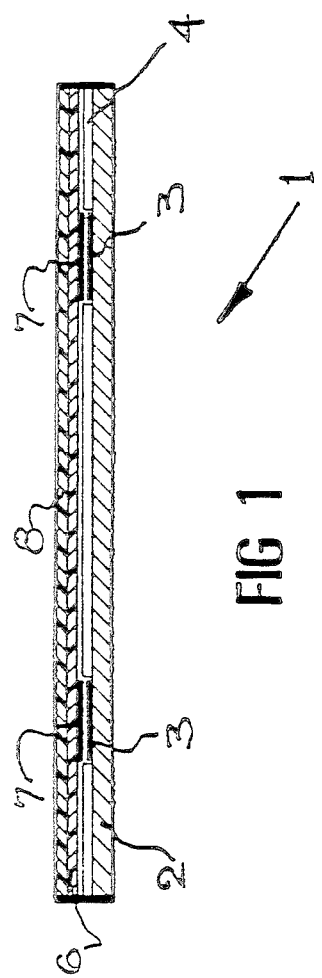
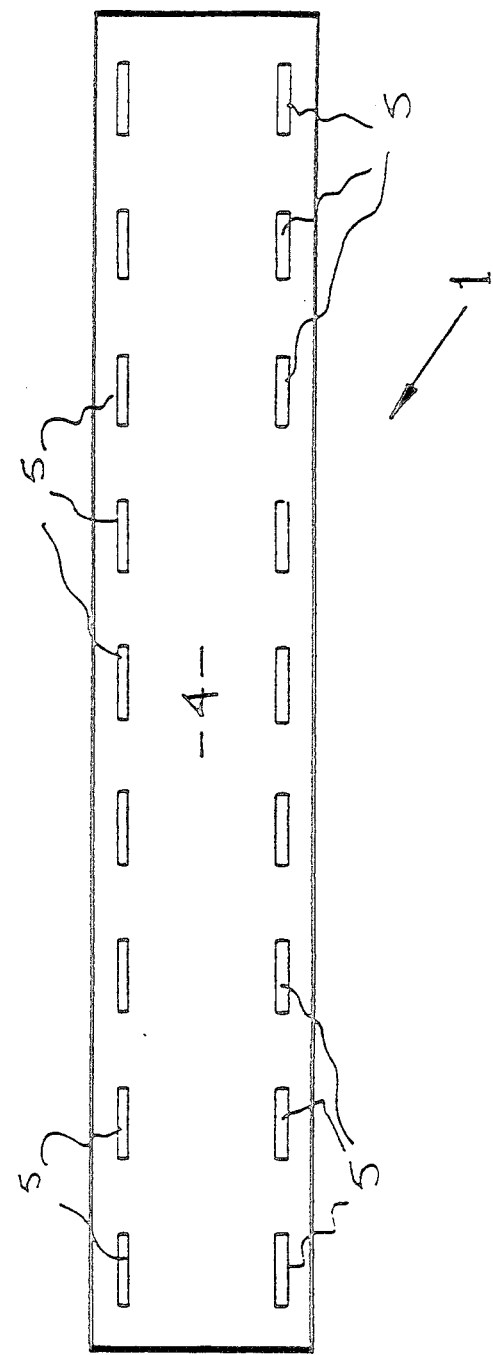
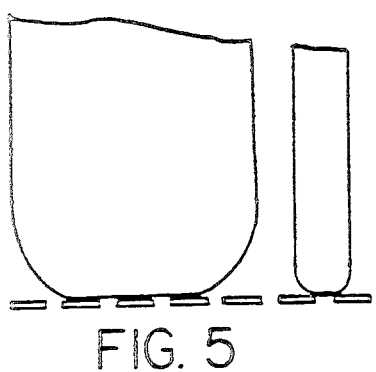
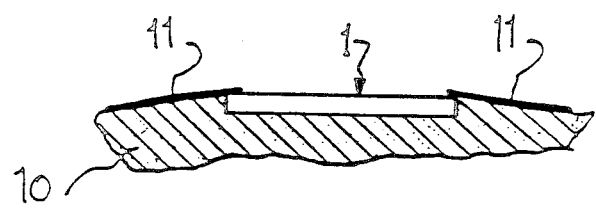
FIG 1
FIG 2
FIG. 5
FIG 4

SPEED DETECTOR FOR TRAFFIC CONTROL

FIELD OF THE INVENTION

The present invention relates to a system for use in the monitoring of the flow and speed of traffic passing along roads, streets, highways and the like.

DESCRIPTION OF BACKGROUND ART

Up until this time a real problem has been the provision of efficient and effective means for the monitoring of traffic flows and, in particular, the speed of traffic travelling along public roads. Until very recently, radar systems have generally been acknowledged to be the most accurate speed measuring devices but they suffer from a number of major drawbacks, such as their high capital cost and their inability to positively identify the source of the speed reading.

Amphometers based on so-called 'treadle' switches, or on pneumatic cables, are cheap and still reasonably accurate but also suffer from a number of disadvantages. The switches themselves have poor triggering characteristics when activated by a passing vehicle, necessitating a large distance between the two required sensors in order to make an accurate speed reading. This makes them cumbersome to install, since two separate sensors must be laid on the road surface with a distance usually greater than three meters separating them.

Amphometers also suffer from their inability to identify the positions of vehicles on a road surface. Moreover, their flimsy construction makes them wholly unsuited as a road based sensor unless a very short working life can be tolerated.

By way of contrast, in the present invention, the configuration of the strip and its pressure switches allows the contact means to be spaced apart by a distance as small as, say, ten centimeters.

Policed traffic surveillance and control is extremely costly, relying on a considerable number of officers to enforce the road rules. Technology has provided some answers such as radar-based speed measuring devices and loop detector-based traffic camera installations. Both systems are expensive, with radar-based systems generally requiring an operator. Radar/camera systems do exist but because of their high cost and vulnerability to vandalism are rarely operated unmanned.

The inefficiency of these surveillance systems has made it impractical to deploy large numbers of enforcing agents in the field.

It is therefore an object of the present invention to overcome the above and other disadvantages by the provision of a simple, cheap but efficient traffic monitoring system capable of being deployed in large numbers so as to obviate the need for a high level of police surveillance. Other objects of the invention will become apparent from the following description.

SUMMARY AND OBJECTS OF THE INVENTION

According to one aspect of this invention there is provided an arrangement for monitoring traffic in the form of an elongate strip member adapted to be placed on a road surface, said elongate strip member including a base layer; at least two longitudinally extending and laterally spaced apart electrical contact means being provided on the upper surface of said base layer; a dielectric spacer layer extending over the upper surface of said base layer; a plurality of longitudinally and laterally spaced apart apertures being provided in said dielectric layer, so as to be located substantially over the electrical contact means provided on the upper surface of said base layer; a resilient material layer extending over said dielectric spacer layer; at least two longitudinally extending and laterally spaced apart electric contact means being provided on the lower surface of said resilient material layer so as to be located substantially over said apertures; said apertures, and said respective electrical contact means, forming a plurality of longitudinally spaced apart switches; each of said switches being connected to monitoring and/or timing means associated with said strip member; means being provided to supply voltage across said electrical contact means; the arrangement being such that on one or more vehicles passing over said elongate strip member, one or more of said switches will be actuated by said resiliently mounted electrical contact means being caused to make contact with said base layer electrical contact means through one or more of said apertures, to thereby actuate said monitoring and/or timing means.

For further protection from wear and weather, a covering layer may be provided, this covering layer extending over the upper surface of the resilient layer.

BRIEF DESCRIPTION OF DRAWINGS

In order that the reader may gain a better understanding of the present invention, hereinafter, will be described one or more preferred embodiments thereof, by way of example only and with reference to the accompanying drawings in which:

FIG. 1 is a transverse cross-section of an elongated strip member according to the present invention;

FIG. 2 is a plan view of a dielectric spacer layer;

FIG. 3 is an "exploded" view;

FIG. 4 shows an inventive strip affixed to a road surface;

Throughout the drawings, like integers are referenced by the same numeral.

DETAILED DESCRIPTION OF THE PREFERRED EMBODIMENT

Figure 5:
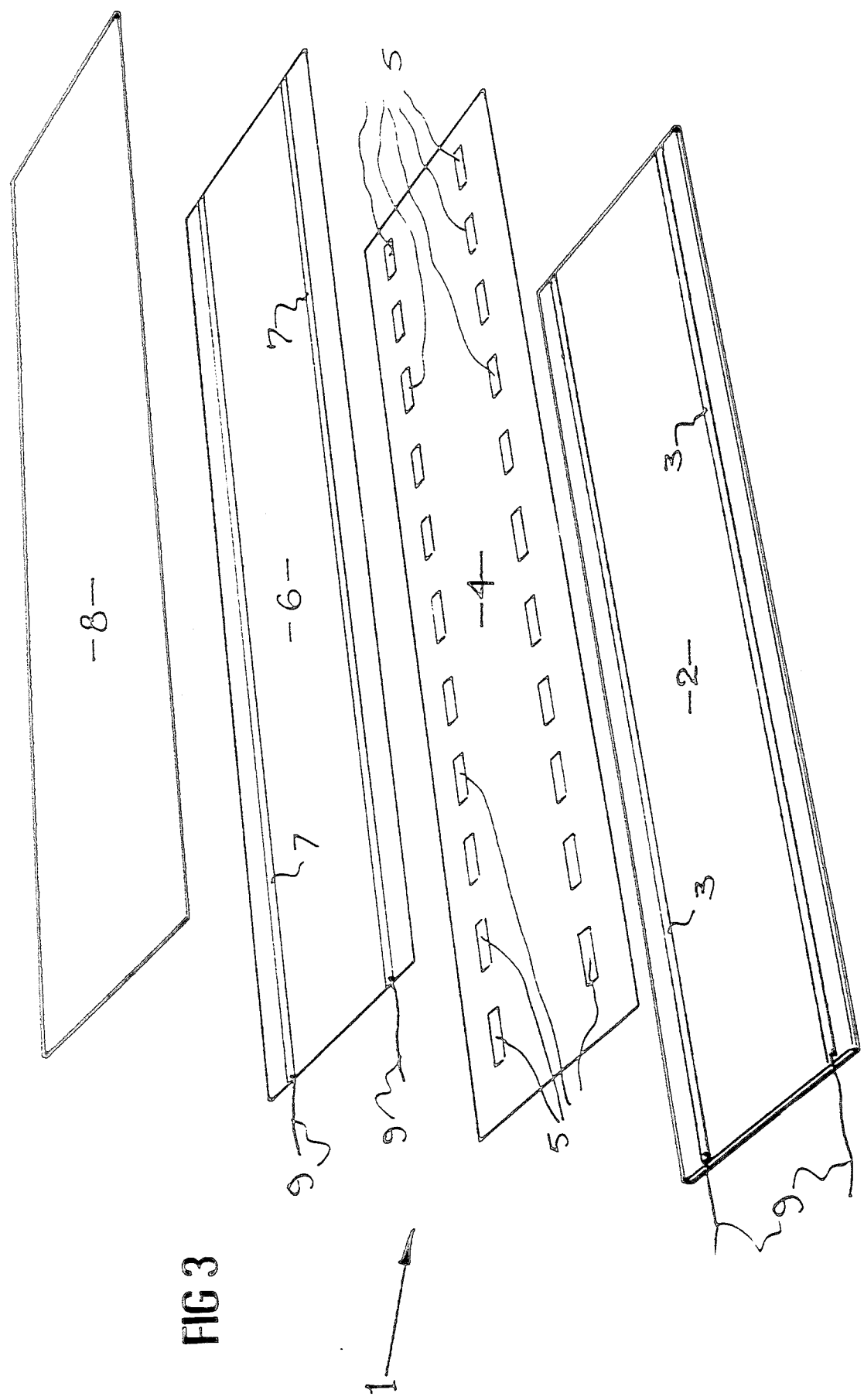
FIG. 5 is a composite drawing to show how a vehicle passing over an elongate strip member may be identified by the width of its tires.

In the drawings there is to be seen an inventive elongated strip member 1 which includes a base layer 2 manufactured from a suitable material such as, for example, aluminium sheet or polyester film. Base layer 2 is of a length sufficient to extend across the road or other area to be monitored, and is of a width such as to permit effective use, depending on the kind of application.

Longitudinally-extending and laterally spaced-apart electrically conductive contact means 3 are provided on base layer 2 in some suitable manner such as, say, screen printing using electrically conductive ink. Contact means 3 extends preferably over the whole length of base layer 2 and, ideally, are spaced-apart one from the other by a distance corresponding substantially to the distance over which the measurement of speed is to be made. Over the upper surface of base layer 2 there extends a dielectric spacer layer 4 made of a suitable material such as, for example, a screen printable dielectric ink spacer material. However, it is envisaged that dielectric spacer 4 can be of any appropriate material or form and may even be applied by spraying coating or the like.

The material of the dielectric spacer layer 4 is ideally of the same, or perhaps slightly larger, dimensions as are the electrical contact means 3 mounted upon base layer 2, and so disposed as to overlie the said contact means 3.

Dielectric spacer layer 4 is most advantageously formed with a plurality of apertures, as referenced 5 formed therein, these slots or holes, etc. preferably being in rows as shown. Apertures 5 are preferably laterally spaced-apart, one from the other in pairs, so that a plurality of these spaced-apart apertures 5 extend longitudinally down each side of the dielectric spacer layer 4, spaced inwardly from the side edges thereof. As shown, in a preferred form of the invention, slots 5 are substantially elongated, however, other shapes and/or configurations of these apertures are equally contemplated. Extending over dielectric spacer layer 4 there is a layer of resilient material 6, which may be such as a resilient, or at least flexible, plastic or resinous material. Ideally, this resilient material may well be that known as MYLAR*, which material may advantageously form also the base layer 2, nevertheless, other materials having similar properties might as well be employed. In any case, it is important that the material of the layer 6 possesses resiliency so that, on pressure being applied, the material has a degree of elastic memory such that it will return to its initial state when the pressure is removed.

Longitudinally-extending and laterally spaced-apart electrically conductive contact means 7 are provided on the lower side of resilient material layer 6 in some appropriate manner such as, say, screen printing with electrically conductive ink. Contact means 7 preferably extends over the entire length of the resilient layer 6 and, here again, are most advantageously spaced-apart from each other by that distance which corresponds substantially to the distance over which the measurement of speed is to be made.

Resilient layer 6 may be affixed to the upper surface of the apertured dielectric layer 4 or, in the case where the dielectric layer does not extend over the whole area of base layer 2, to the base layer directly, in any suitable manner such as by bonding agents, other adhesives and the like so that it is affixed in position and so that electrical contact members 7 extend over and above the apertures 5 in the dielectric spacer layer 4.

It should be appreciated that, however the resilient layer 6 is attached, or affixed, to the underlying layers so that it, and the contact means 3 and 7 are able to move relative to, and through, apertures 5, to be hereinafter described.

An upper covering layer 8 may be provided to extend over resilient layer 6. Covering layer 8 may be of any suitable and/or known covering or protective material such as film, paint, surface coating, or the like layer.

In many applications, resilient layer 6 will be the top surface of the strip and thus will be exposed to wear and weather. In such an application, the protective characteristics of the upper covering layer 8 should therefore be incorporated into the nature of resilient layer 6.

From the above it will be understood by one skilled in the art that the inventive elongated strip member is well-adapted to be used by being extended across a road surface over which traffic passes.

It might also be understood that components 2, 4 and 6 as described hereinbefore constitute what most aptly might be termed a "membrane switch", this being an integral part of the traffic monitoring system according to the present invention.

Means are provided such as an appropriate power source or connection to a source of power, together with appropriate cables or wiring 9, whereby a voltage is applied across the contacts of base layer 2 and resilient layer 6; wiring or connections in the form of cables or the like also extending from the strip to monitoring and/or timing means associated with the strip. This will be described further hereinafter.

INDUSTRIAL APPLICABILITY

In use, with the strip 1 extending across a road or street, and on a vehicle passing over the strip, the pressure of the vehicle on the strip will cause the resilient material 6, mounting the contact members 7 to be depressed, and for the resiliently mounted contact member or members to be passed through the one or more apertures 5, in the dielectric spacer layer 4, to in turn make contact with the base layer contact means 3, to thus complete a circuit and actuate appropriate monitoring and/or timing means (as will be described hereinafter). On a vehicle moving away from the strip 1, the pressure thereon is released and this will enable the resilient material layer 6 to return to its original position or orientation, this in turn withdrawing the contact member or members 7 from the one or more apertures 5 in the dielectric spacer layer 4 and breaking the contact between the contact member or members.

It will be appreciated that in use, each aperture 5 is in combination with the base layer 2 and a resiliently mounted contact member 3, 7, constitutes a transducer or switch. In essence therefore, the strip 1 is provided with a plurality of longitudinally extending and laterally spaced apart switches. These so-constituted switches may be grouped in any configuration or they may be wired independently back to controlling electronics. In the case of discrete switches, the smaller the length the greater will be the resolving power.

In the form of the invention shown in the accompanying drawings and as described by way of example herein, the apertures 5 and the so-formed switches (as defined herein) are longitudinally and laterally spaced apart one from the other. It is, however envisaged that in one form of the invention, (not shown), unitary, elongate slots can extend down or adjacent each side of the intermediate cover layer, the slots being laterally spaced apart in the manner described. It is however preferred that there be a plurality of longitudinally spaced apart apertures 5 arranged in substantial pairs which are laterally spaced apart one from the other, as for example shown in the accompanying drawings.

Figure 6:
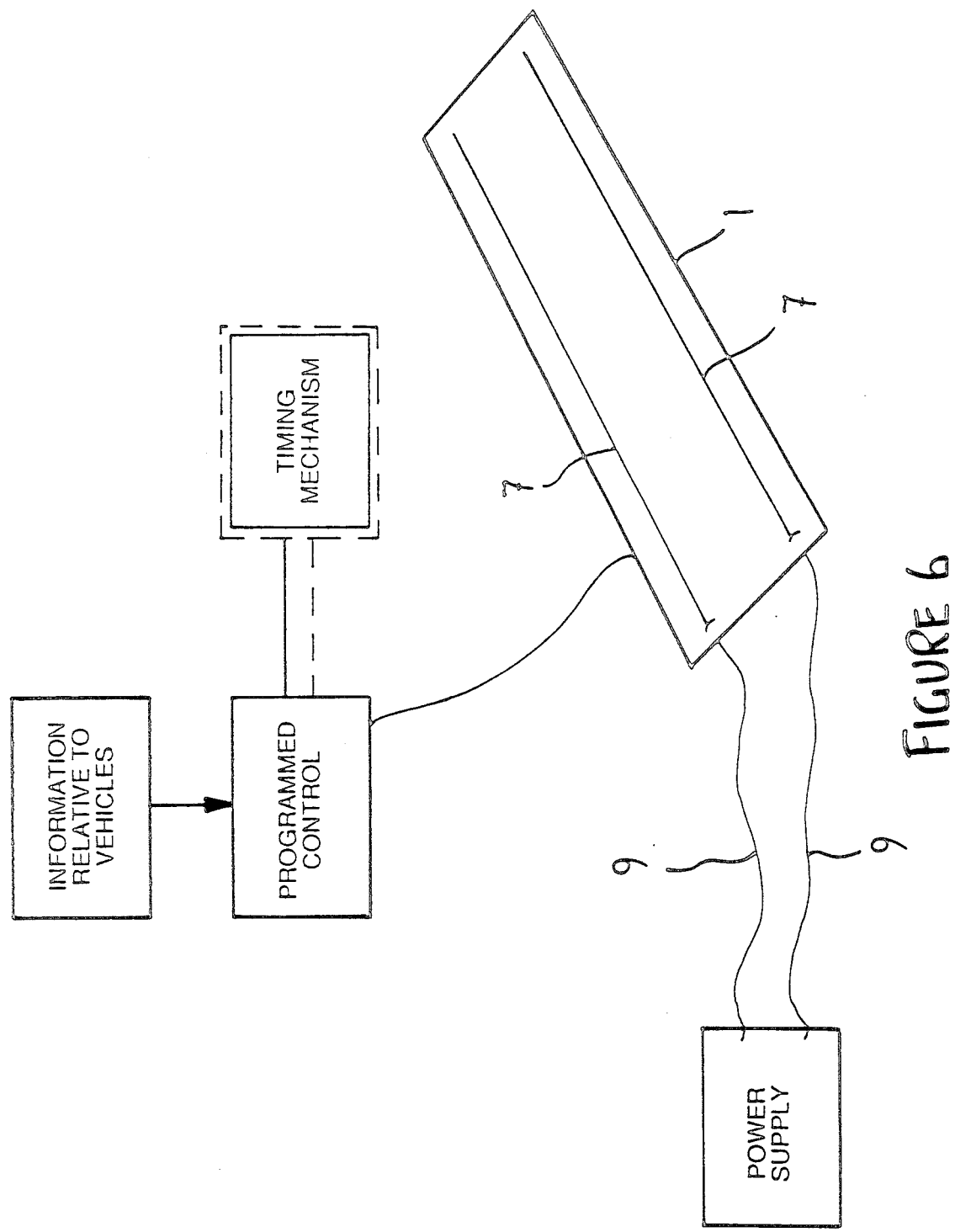
FIG. 6 is a diagrammatic block diagram of an arrangement according to one form of the present invention.

In preferred forms of the invention, as shown by way of example in FIG. 6 of the drawings, connection means 9 lead from each switch arrangement to appropriate monitoring and/or timing means, so that on one or more vehicles passing over the strip one or more switch means will be actuated. The switch means will of course be actuated by the vehicle passing over the contact members which are depressed so as to pass through the one or more apertures to thereafter make contact with the base layer contacts, this, as hereinbefore described, constituting a switch means to actuate and/or deactuate associated monitoring and/or timing means.

In the preferred form of the invention the monitoring and/or timing means can for example take the form of a microcomputer or programmed control means, into which is programmed or fed appropriate information concerning the speed limit for various forms of vehicle, the width of tires for various forms of vehicle and the like. This is by way of example only, and any appropriate information can of course be programmed into the control or monitoring means. Thus, in one application of the invention information concerning the maximum speed allowed for motor cars is programmed into the monitoring or control means, the switches (as referred to hereinbefore) each being connected to the control means.

In one form of the invention the monitoring means is programmed with the normal speed for a motor vehicle, such as a motor car, and on the wheel of a motor vehicle passing over the first contact member, the contact member will come into contact with the base layer contact so as to actuate the timing mechanism, the timing mechanism then being deactuated on the motor vehicle wheel passing over the second contact member.

The speed limit programmed into the monitoring means is then compared with the recorded speed of the vehicle over a given distance (being the distance between the contact members) and if the speed is in excess of the programmed limit, appropriate recordings can be made. Preferably however, the monitoring means is connected to or associated with an appropriate camera which is preferably so positioned adjacent the strip so as to take a photograph of the motor vehicle, and in particular a photograph of the registration details; means may also be provided in association with the monitoring means so that the photograph will include details of the date, position, location and the like. It will be appreciated therefore that the invention allows for a photograph to be taken of the offending vehicle, which can then be used in evidence or in support of a prosecution for speeding.

In a further form of the invention and in order to provide greater accuracy if desired, the monitoring means can be so programmed and provided with a time delay, which will take into account the speed of both the front and rear wheels of the motor vehicle. Thus, in such a use of the present invention, the motor vehicle will pass over the strip, the front wheels passing over first and activating and deactivating the monitoring means as referred to hereinbefore. Immediately following such deactivation, once the front wheels of a motor vehicle have left the strip, a time delay will be initiated for a period of time sufficient to allow the rear wheels of a motor vehicle to reach the strip, the rear wheels then activating and deactivating the monitoring means in the manner described, means being provided within the monitoring means (and the monitoring means being so programmed) such as to compare the times relative to the passage of both the front and rear wheels over the strip, such that if the times are within an acceptable range, and still in excess of the programmed speed limit, appropriate camera means or the like will be activated.

The individual switches, or groups of switches, spaced along the length of the elongate strip allow independent speed readings to be taken on each of a vehicle's tires. The length of each switch, or group of switches, will determine the resolution of the strip. For example, if each switch, or group thereof, is 5 cm long then, if one or two adjacent sets of switches are actuated by the front wheel of a vehicle, this tire will have a width of no more than 10 cm and hence can be identified as belonging to a bicycle or a motorbike. If three to five sets of adjacent switches are triggered, then the minimum tire width will be 10 cm and the maximum 25 cm. This will identify the vehicle as being a car. If five or more sets of adjacent switches are triggered, the vehicle will be identified as being a truck or a bus. Obviously, then, the smaller the length of the discrete switches—in this example 5 cm—the greater will be the resolving power. FIG. 5 of the drawings illustrates this clearly.

In a further form of the invention, and in addition to the features referred to above, or as an alternative thereto, the monitoring means can be so programmed as to keep a count of the number of vehicles passing over the strip and/or to recognise the type of vehicle concerned, and/or to check the speed limit for that particular vehicle. For example, the monitoring means can be so programmed to recognise that if only one pair of contact members is activated, this will indicate that a bicycle or motor cycle is passing over the strip, and the programme will allow for a comparison of the speed over the strip with the programmed speed for such a vehicle. If for example three contact members are activated, this will indicate that a motor car is passing over the strip, whereas if for example five or six are activated this will indicate that a truck or bus is passing over the strip. Thus, depending upon the number of slots or holes through which the contact members pass on a vehicle passing thereover (and thus on the switches activated), the speed of the vehicle passing over the strip will be compared with the speed limit for that particular type of vehicle as programmed into the monitoring means.

In a further form of the invention and where for example the strip may extend across a multi-lane road or highway, the monitoring means can be further programmed to identify the lane in which the vehicle is travelling, so as to monitor not only the speed, and/or the type of vehicle, but also the lane in which the vehicle is travelling. For example, where a strip extends across a multi-lane highway, the first ten slots or holes through which the contact members pass (and thus switches actuated) may indicate the first lane, the next ten the second lane, the next ten the third lane and the like.

It will be appreciated that the above number of slots or holes through which the contact members pass (and thus switches as defined) are by way of example and will vary depending upon the size of the holes and slots, the size and configuration of the strip and the like.

If desired, in addition to being associated with appropriate camera means for taking a photograph of the motor vehicle, additional means such as for example warning lights or the like or recording means, associated with the monitoring means can be provided to record for example statistics and details of motor vehicles passing down the road concerned.

It is envisaged that in one form of the invention, in use, the monitoring strips of the present invention can be formed or painted of a distinctive colour and numerous strips placed along the lengths of highways, operative strips being interspersed with non-operative plain strips (for example of a colour or colours substantially the same as the operative strips) so that a motorist is unaware as to which strips are operative and which not. A large number of highly visible speed enforcement devices should have the effect of substantially reducing speed limits.

While the invention has been described with reference to a particular form of switching means, and contact means, other forms of switching can be used. For example, a pressure sensitive polymer could be provided within the apertures to make contact between the contact means.

Because activation pressures from road vehicle tires are significantly higher than are those commonly encountered by "membrane" switches in general use—for example, touch key pads—and the area over which this pressure acts is significantly larger—the width of a tire compared with, say, finger tips—, it is necessary that the slots or apertures 5 in dielectric spacer layer 4 are dimensioned so as to accommodate the harsh conditions encountered in the essentially hostile road surface environment. Previously, in membrane switches in general, consideration of aperture configuration with reference to maximum pressure build-up has been largely irrelevant.

In the present invention, however, when the switches are activated by a passing vehicle, the upper contacts are forced through the slots or apertures 5 in dielectric spacer layer 4. Air resident in this gap is compressed unless it is able to escape from the aperture. Now, if the tire contact area overlies the entire aperture, the air thus entrapped in the gap will be pressurised to that pressure expected by the tire activating the switch. In many circumstances, this would cause unacceptable stress on the sides of the apertures and could well lead to static or fatigue failure in the surrounding material.

Using proper design parameters for the apertures, the condition whereby all air in the gap is pressurised to the extent of the activation pressure can be avoided. Air will escape to other regions of the apertures, thus reducing pressure build-up. The length of the aperture, or slot, will directly affect the level of maximum pressure build-up. The activation and deactivation characteristics of the switches are also directly related to slot design. The maximum pressure build-up inside the switches will affect the activation pressure of the switches.

In a most highly preferred embodiment of the present invention, each of the apertures 5 formed in dielectric spacer layer 4 may be, say, 30 cm long and 2 mm wide; the dielectric spacer layer 4 may be perhaps in the order of 10 micrometers thick.

The design parameters of the slots allow control of maximum pressure build-up in the switches so that this pressure does not go beyond an acceptable level. This controlled pressure build up also aids in the rapid deactivation of the switches upon release of the activation pressure.

It should be appreciated that in use these strips are bonded or adhered to a road surface by some appropriate means and this is shown in FIG. 4 of the drawings. Here is depicted an inventive elongated strip member 1 affixed to a road surface 10 by, as example only, a flexible epoxy resin compound adhesive 11. The adhesive will grout the aggregate, with its defects, to thus provide a smooth top surface for the mounting of the inventive strip member 1. It will also be appreciated that the integral nature of the strips, when formed, hold the contact members in a fixed spaced relationship one with the other, within each strip, so as to avoid difficulties which arise in known forms of amphometers, wherein accurate spacing of the sensor is difficult to achieve on site. By way of contrast, in the present invention, rapid and easy mounting presents no problem with correct distances being able to be measured on site.

In the present invention the contact members and switches (as defined) are laterally and longitudinally spaced apart from each other by a known fixed distance, and will be particularly satisfactory from the point of view of supporting the speed results. Additionally, the integral sealed nature of the strips, and their sturdy construction, provides a sensor capable of enduring long term use on a road surface. The solid nature of the strips and their rigid attachment to the road surface makes destruction by vandals difficult.

In use, vandalism is also reduced by the interspersed nature of the operative strips, as it is difficult if not impossible to determine which strips are operative and which nonoperative.

From the above, it will be readily appreciated by those skilled in the art that numerous variations and modifications may be made to the invention without departing from the spirit and scope thereof as set out in the following claims. The claims defining the invention are as follows.

I claim:

1. An arrangement for monitoring traffic comprising:
   an elongate strip member adapted to be placed on a road surface, said elongate strip member including a base layer;
   at least two longitudinally extending and laterally spaced apart electrical contact means being provided on the upper surface of said base layer;
   a dielectric spacer layer extending over the upper surface of said base layer;
   a plurality of longitudinally and laterally spaced apart apertures being provided in said dielectric layer, so as to be located substantially over the electrical contact means provided on the upper surface of said base layer;
   said apertures in said dielectric layer being formed of at least two sets of longitudinally spaced apart apertures, each said set being laterally spaced apart one from the other by a distance over which monitoring and/or timing of traffic is to take place;
   a resilient material layer extending over said dielectric spacer layer;
   at least two further longitudinally extending and laterally spaced apart electrical contact means being provided on the lower surface of said resilient material layer so as to be located substantially over said apertures;
   said longitudinally and laterally spaced apart apertures, and said respective electrical contact means, forming a plurality of longitudinally spaced apart switches, each of said switches being connected to monitoring and/or timing means associated with said strip member; and
   means being provided to supply voltage across said electrical contact means;
   whereby upon one or more vehicles passing over said elongate strip member, one or more of said switches will be actuated by said resiliently mounted electrical contact means being caused to make contact with said base layer electrical contact means through one or more of said apertures, to thereby actuate said monitoring and/or timing means.

2. The arrangement according to claim 1, and further including a covering layer extending over the upper surface of the said resilient layer for protection from wear and weather.

3. The arrangement according to claim 1, wherein said base and resilient material layers are made from a flexible resinous or plastic material.

4. The arrangement according to claim 1, wherein the elongate strip member constitutes a membrane switch.

* * * * *